United States Patent
Skinner et al.

(10) Patent No.: US 10,852,124 B2
(45) Date of Patent: Dec. 1, 2020

(54) FIXTURE FOR CHECKING A BEVEL GEAR PRODUCT AND RELATED METHOD

(71) Applicant: AMERICAN AXLE & MANUFACTURING, INC., Detroit, MI (US)

(72) Inventors: Sean M. Skinner, Canton, MI (US); James C. Martz, Waterford, MI (US); Jeff Beier, New Hudson, MI (US); Ralph Perez, Plymouth, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/449,487

(22) Filed: Jun. 24, 2019

(65) Prior Publication Data

US 2019/0310073 A1  Oct. 10, 2019

Related U.S. Application Data

(63) Continuation of application No. 16/263,066, filed on Jan. 31, 2019, now Pat. No. 10,401,150.

(60) Provisional application No. 62/774,392, filed on Dec. 3, 2018, provisional application No. 62/639,189, filed on Mar. 6, 2018.

(51) Int. Cl.
*G01B 11/06* (2006.01)
*G01B 11/26* (2006.01)
*G01B 11/24* (2006.01)
*G01B 11/22* (2006.01)

(52) U.S. Cl.
CPC .............. *G01B 11/06* (2013.01); *G01B 11/22* (2013.01); *G01B 11/2416* (2013.01); *G01B 11/26* (2013.01)

(58) Field of Classification Search
CPC ..... G01B 11/06; G01B 11/2416; G01B 11/24; G01B 11/22; B23K 26/035; B23K 26/42; G01N 21/952
See application file for complete search history.

(56) References Cited

U.S. PATENT DOCUMENTS

| 2,060,518 | A | 11/1936 | Miller |
| 2,539,597 | A | 1/1951 | Staples |
| 6,657,711 | B1 * | 12/2003 | Kitagawa ........... G01B 11/2755 280/86.758 |
| 7,177,740 | B1 * | 2/2007 | Guangjun ............... G01C 1/06 356/139.09 |
| 9,618,425 | B2 * | 4/2017 | Clark ................... G01B 11/245 |
| 2011/0032538 | A1 | 2/2011 | Maschirow et al. |

(Continued)

OTHER PUBLICATIONS

U.S. Appl. No. 16/263,066, filed Jan. 31, 2019.

*Primary Examiner* — Maurice C Smith
(74) *Attorney, Agent, or Firm* — Burris Law, PLLC (57) ABSTRACT

A fixture for gauging a bevel gear product that is received on a mount and rotated relative to a base while a plurality of measuring lasers and a rotational position sensor are operated. Data from the measuring lasers and the rotational position sensor are employed by a controller to generate one or more data sets. The data set(s) include dimensional information on the bevel gear product as a function of a rotational position of the bevel gear product about the mount axis. Various dimensions of the bevel gear product are gauged by the controller based on information in the data set(s).

12 Claims, 6 Drawing Sheets

(56) References Cited

U.S. PATENT DOCUMENTS

| | | | |
|---|---|---|---|
| 2014/0071580 A1* | 3/2014 | Higginson | H01L 21/67132 361/234 |
| 2014/0347438 A1* | 11/2014 | Nygaard | G01N 21/952 348/36 |
| 2016/0161250 A1 | 6/2016 | Nakamura | |
| 2018/0252517 A1 | 9/2018 | Le Neel | |

* cited by examiner

FIXTURE FOR CHECKING A BEVEL GEAR PRODUCT AND RELATED METHOD

CROSS-REFERENCE TO RELATED APPLICATIONS

This application is a continuation of U.S. application Ser. No. 16/263,066 filed Jan. 31, 2019, which claims the benefit of U.S. Provisional Application No. 62/639,189, filed on Mar. 6, 2018 and U.S. Provisional Application No. 62/774,392, filed on Dec. 3, 2018. The disclosures of each of the above-referenced application is incorporated by reference as if fully set forth in detail herein.

FIELD

The present disclosure relates to a fixture for checking a bevel gear product and a related method for checking a bevel gear product.

BACKGROUND

This section provides background information related to the present disclosure which is not necessarily prior art.

The manufacture of bevel gears, such as straight bevel gears, helical bevel gears, spiral bevel gears and hypoid gears typically requires numerous gauges to ensure that the bevel gear has been manufactured to a desired degree of accuracy. Typically, various types of hard gauges would be fabricated for the gauging of a bevel gear. The hard gauging would typically include "go" and "no-go" gauges, which are used to check whether a certain feature is within tolerance (i.e., "go") or outside of the tolerance (i.e., "no-go"), and other gauges that may need to be "mastered" (i.e., calibrated based on a known dimension that is found on a "master"). These other gauges may utilize dial indicators or pressurized air (i.e., an air gauge) to measure or quantify deviations from the dimension on the "master".

Because such hard gauging is typically specific to a given bevel gear configuration, one drawback associated with such an extensive use of hard gauging concerns the cost for designing, fabricating and certifying or qualifying the hard gauging. In this regard, the costs for acquiring and certifying/qualifying hard gauging for a given bevel gear configuration, which can be significant, are typically incorporated into the pricing for a specific bevel gear configuration. Moreover, the lead-time for designing, fabricating and certifying/qualifying the hard gauging can likewise be significant.

SUMMARY

This section provides a general summary of the disclosure, and is not a comprehensive disclosure of its full scope or all of its features.

In one form, the present disclosure provides a fixture for performing a gauging operation on a bevel gear product having a back face, a through bore, a thickness, a counter bore, a face angle, a back angle and an outside diameter. The fixture includes a base, a mount, a rotational position sensor, a plurality of measuring sensors and a controller. The mount is coupled to the base for rotation about a mount axis and includes a plurality of feet and a plurality of fingers. The feet cooperate to establish a predetermined plane. The fingers are movable along the mount axis relative to the feet and are configured to center the bevel gear product about the mount axis and to permit the back face of the bevel gear product to rest against the feet so that the back face is co-planar with the predetermined plane. The rotational position sensor has a first sensor portion, which is fixedly coupled to the base, and a second sensor portion that is coupled to the mount for rotation therewith. The rotational position sensor senses a rotational position of the mount relative to the base and responsively generates a rotational position sensor signal. The measuring lasers are coupled to the base and are disposed about the mount. Each of the measuring lasers is configured to collect a set of profile data and responsively generate a data signal. The controller is coupled to the rotational position sensor and the plurality of measuring lasers. The controller receives the rotational position signal and each of the data signals and responsively generates at least one data set that comprises dimensional information on the bevel gear product as a function of a rotational position of the bevel gear product about the mount axis. The controller is configured to: a) gauge the first back face based on the at least one data set; b) gauge the first through bore based on the at least one data set; c) gauge the first counter bore and the first thickness based on the at least one data set; and d) gauge the first face angle, the first back angle and the first outside diameter based on the at least one data set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
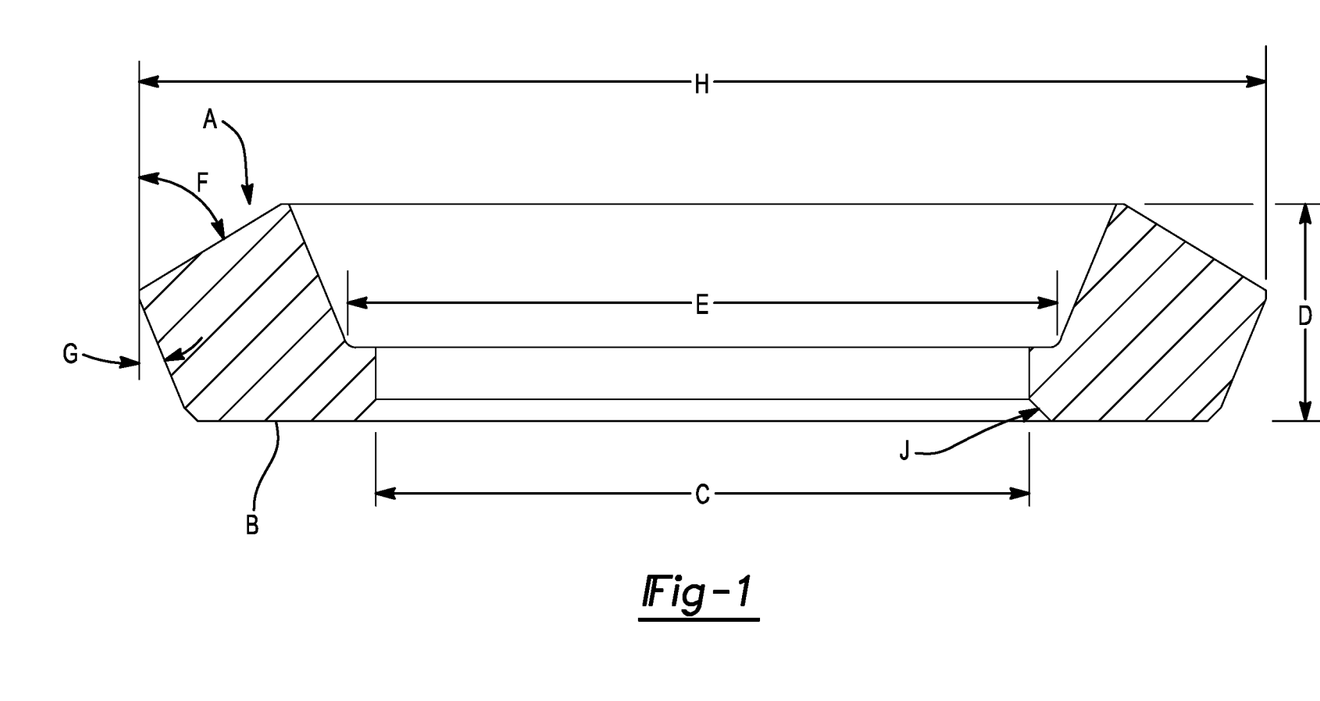
FIG. 1 is a section view of an exemplary bevel gear product.

With reference to FIG. 1, an exemplary bevel gear product A is illustrated. The bevel gear product A can have a back face B, a through bore C, a thickness D, a counterbore E, a face angle F, a back angle G and an outside diameter H. The bevel gear product A can optionally include a chamfer J that intersects the back face B and the through bore C. The bevel gear product A can be any type of bevel gear, such as a bevel gear having straight or helical teeth, a spiral bevel gear or a hypoid bevel gear, and may be in a hardened state or in a "green" or "soft" state (i.e., as machined or forged). Alternatively, the bevel gear product A could be a gear blank (i.e., a product that conforms to the shape of a bevel gear but without the teeth of the gear being cut or formed into the blank). Accordingly, it will be understood that the bevel gear product could be formed with or without gear teeth.

Figure 2:
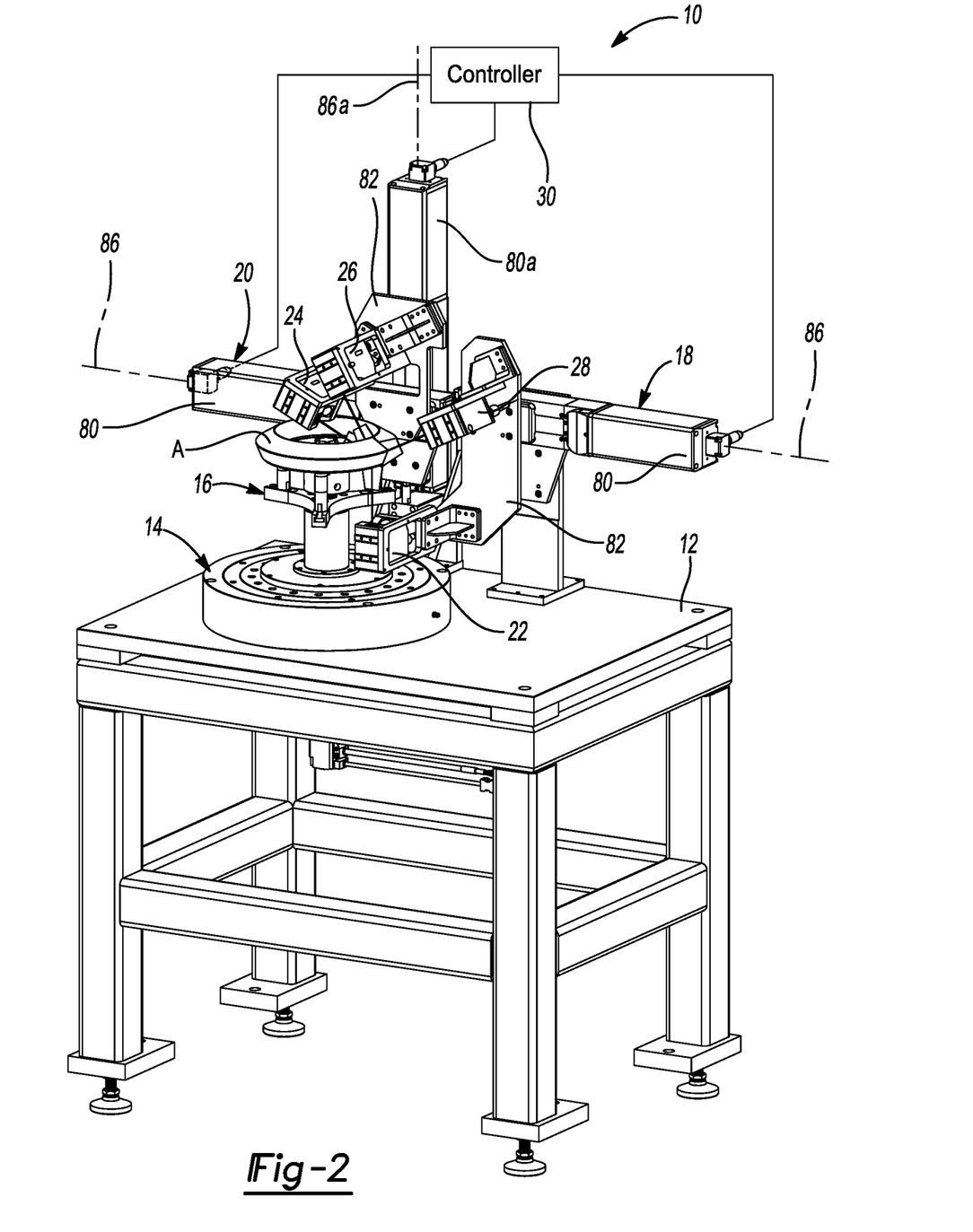
FIG. 2 is a perspective view of an exemplary fixture constructed in accordance with the teachings of the present disclosure.
Figure 3:
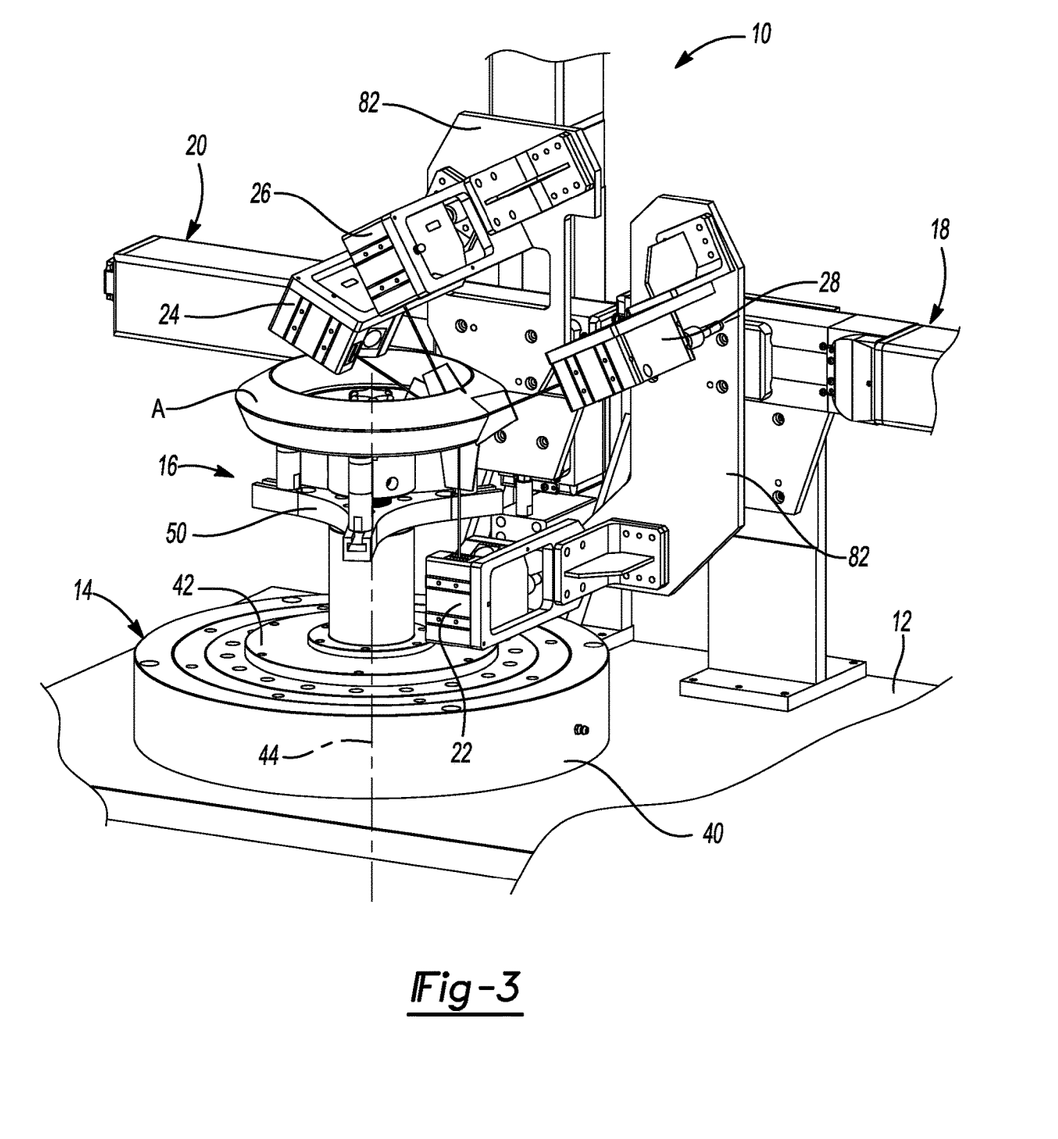
FIG. 3 is an enlarged portion of FIG. 2.

With reference to FIGS. 2 and 3, a fixture for gauging a bevel gear product that has been constructed in accordance with the teachings of the present disclosure is generally indicated by reference numeral 10. The fixture 10 can include a base 12, a spindle 14, a mount 16, a first slide assembly 18, a second slide assembly 20, first, second, third, and fourth measuring lasers 22, 24, 26 and 28, respectively, and a controller 30.

The base 12 can be a structure onto which various other of the components of the fixture 10 can be mounted. In the example provided, the base 12 is a freestanding structure (i.e., a table), but it will be appreciated that the base 12 could be configured somewhat differently.

Figure 4:
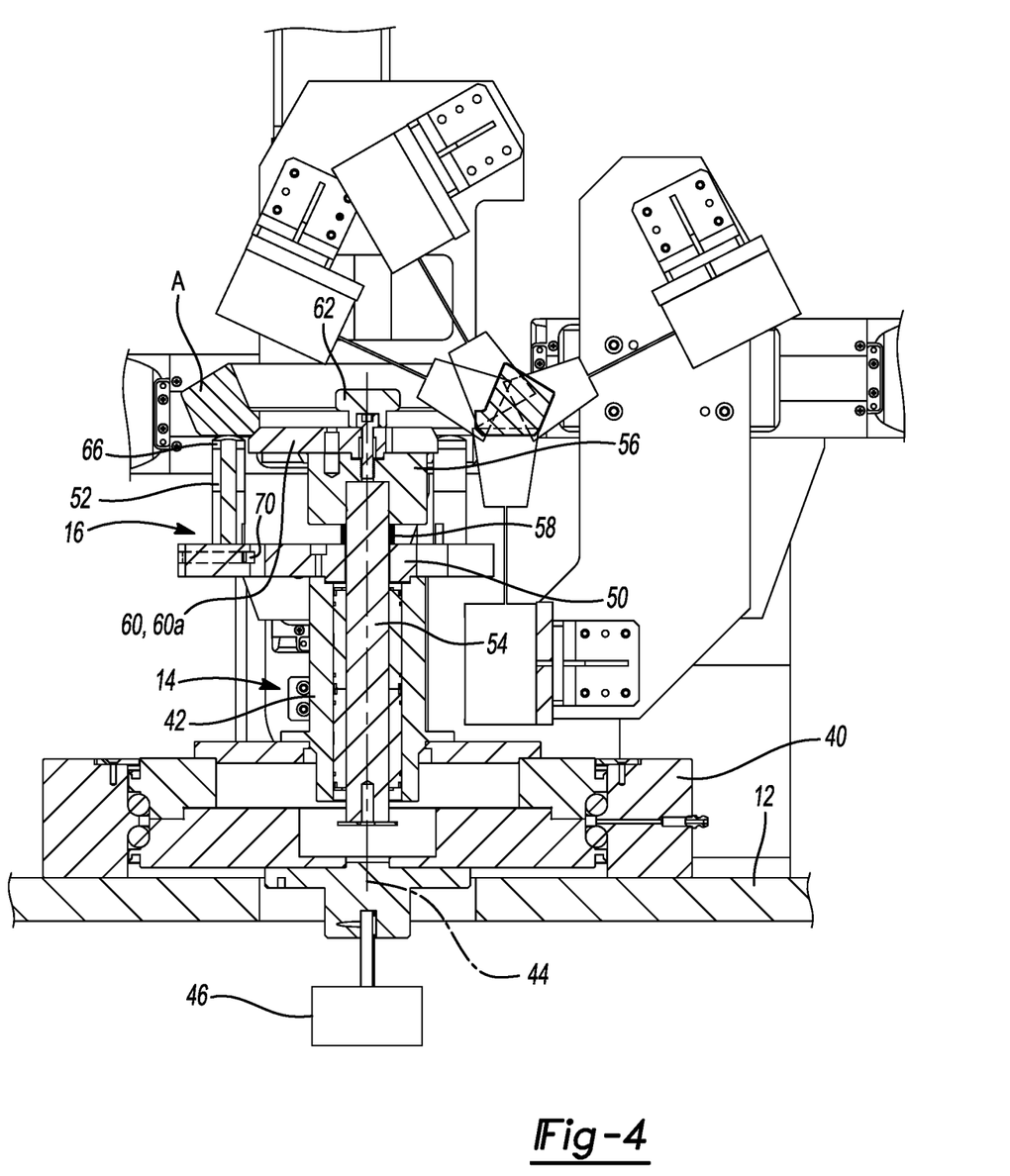
FIG. 4 is a section view of a portion of the fixture of FIG. 2.

With reference to FIGS. 3 and 4, the spindle 14 can include a first spindle portion 40, which can be fixedly mounted to the base 12, and a second spindle portion 42 that can be rotatably coupled to the first spindle portion 40 for rotation about a spindle axis 44. It will be appreciated that the spindle 14 can employ various types of bearings (not shown) so that run-out of the second spindle portion 42 relative to the base 12 or to the first spindle portion 40 can be kept at or below a maximum runout threshold for the fixture 10. Optionally, an electric motor (not shown), such as a servo motor or a stepper motor can be employed to drive the second spindle portion 42 relative to the first spindle portion 40. The electric motor can have a stator, which can be fixedly coupled to the base 12, and a rotor to which the second spindle portion 42 can be rotatably coupled. Also optionally, a rotational position sensor 46, such as an encoder or a resolver, can be employed to sense a rotational position of the second spindle portion 42 relative to the first spindle portion 40 and responsively generate a rotational position signal.

Figure 5:
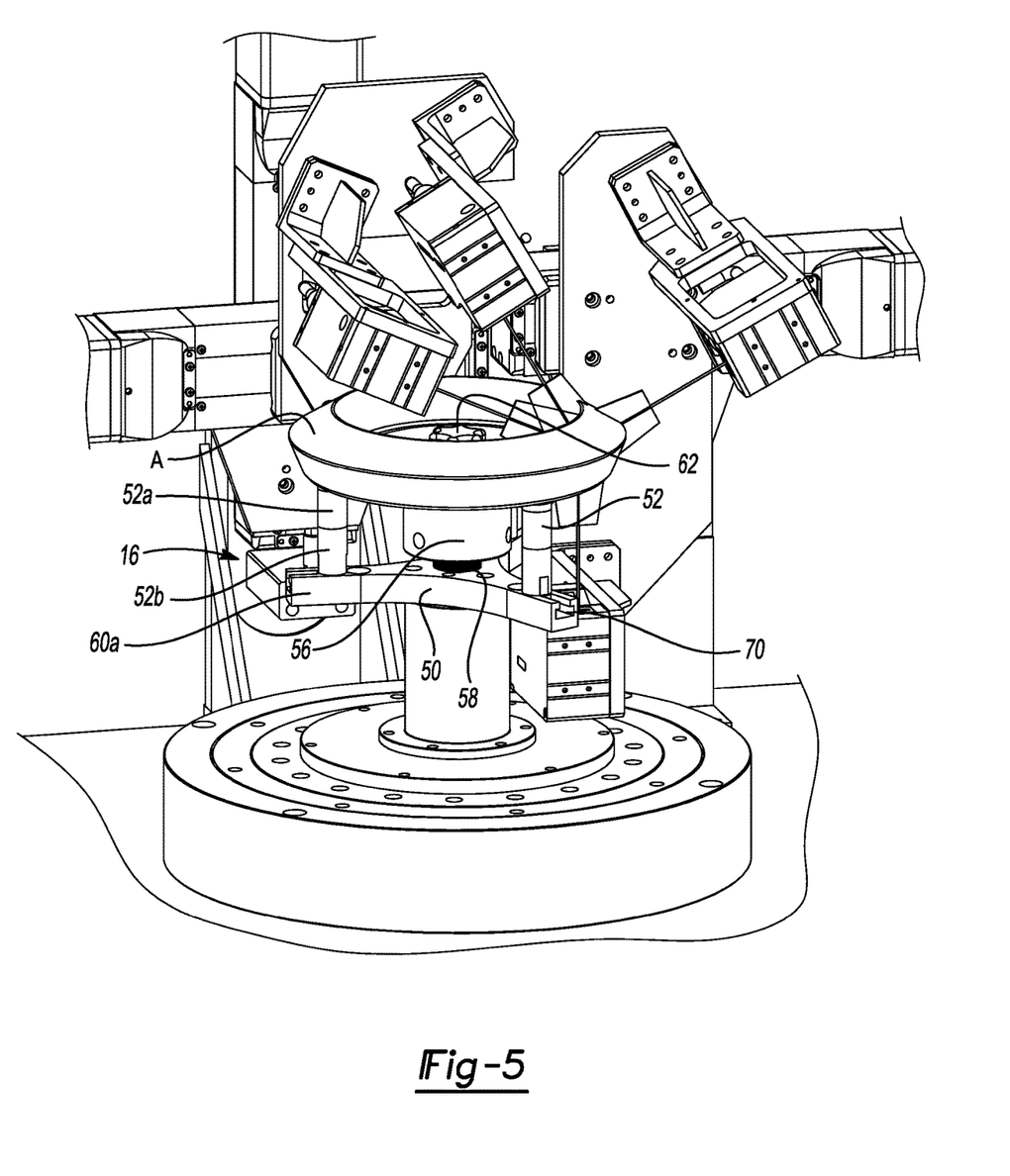
FIG. 5 is a perspective view of a portion of the fixture of FIG. 2.
Figure 6:
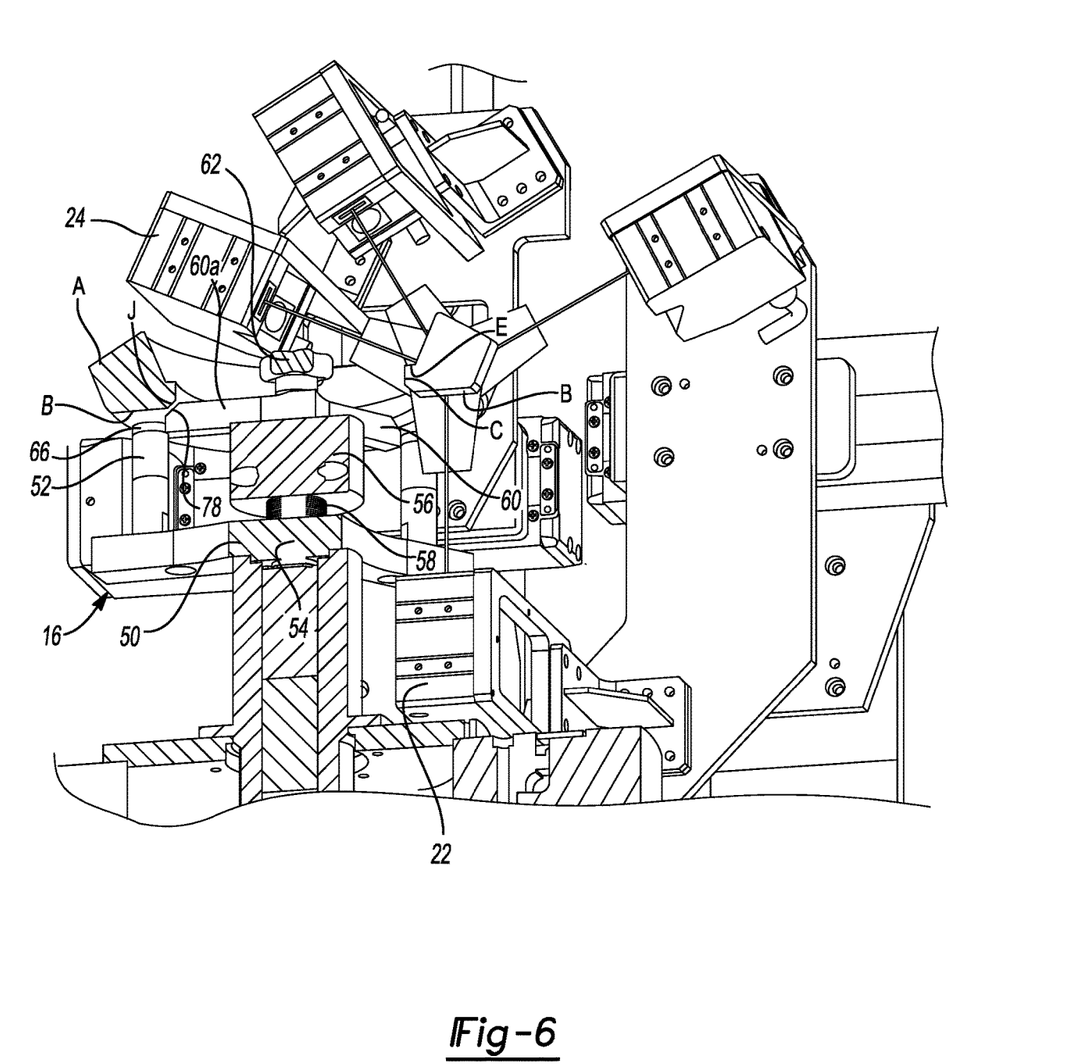
FIG. 6 is a perspective, partly sectioned view of the fixture of FIG. 2.

With reference to FIGS. 4 through 6, the mount 16 can include a mount plate 50, a plurality of legs 52, a guide rod 54, a plunger 56, a plunger spring 58, a locator 60 and a fastener 62. The mount plate 50 can be fixedly coupled to the second spindle portion 42. In the particular example provided, the mount plate 50 is generally Y-shaped but it will be appreciated that the mount plate 50 could be shaped differently. Each of the legs 52 is mounted to the mount plate 50 and includes a rest pad 66. The rest pads 66 cooperate to establish a predetermined plane. In the example provided, a plurality of T-shaped slots 70 are formed into the plate mount 16 in directions that are intersect the spindle axis 44, a T-shaped bolt or fastener (not specifically shown) is received into each of the T-shaped slots 70, and each of the legs 52 is threaded onto an associated one of the T-shaped bolts and tightened against the plate mount 16 to fixedly but releasably secure the legs 52 to the plate mount 16. It will be appreciated that construction in this manner permits the legs 52 to be moved radially inwardly toward the spindle axis 44 and radially outwardly away from the spindle axis 44 so that the legs 52 may be positioned in a desired manner (relative to the spindle axis 44) so that the fixture 10 may accommodate bevel gear products of various different sizes. If desired, each of the legs 52 could be formed of two or more leg components (e.g., leg components 52a and 52b) to permit components of the legs 52 to be swapped out should the position of the predetermined plane along the spindle axis 44 need to be moved when the fixture 10 is set up to gauge a second (i.e., different) bevel gear product. The guide rod 54 can be fixedly mounted to the plate mount 16 and can establish a mount axis that is coincident with the spindle axis 44. In the example provided, the guide rod 54 is slidably received in the second spindle portion 42. The plunger 56 can be fixedly coupled to the guide rod 54 and the plunger spring 58 can be disposed between the mount plate 50 and the plunger 56 to bias the plunger 56 along the mount axis in a direction away from the plate mount 16. The locator 60 can be fixedly but removably coupled to the plunger 56 for movement therewith. The locator 60 can define a plurality of fingers 60a that can be spaced circumferentially apart from one another about the mount axis. As best shown in FIG. 6, the locator 60 can have one or more locator members 78 that can be configured to contact a portion of the bevel gear product A to center the bevel gear product A about the mount axis. In the example provided, each of the locator members 78 is chamfered in a manner that corresponds to the chamfer J formed about the bevel gear product A. The fastener 62 can be threadably coupled to the plunger 56 or the guide rod 54 and can secure the locator 60 to the plunger 56.

The plunger spring 58 is configured such that the weight of the bevel gear product A will cause the plunger spring 58 to compress when the bevel gear product A is placed onto the locator 60 so that the back face B of the bevel gear product A can rest against the rest pads 66. This aligns the back face B so that it is co-planar with the predetermined plane.

Returning to FIGS. 2 and 3, the first and second slide assemblies 18 and 20 can be generally similar and as such, only the first slide assembly 18 will be described in detail. Reference numerals used to identify various components of the first slide assembly 18 will also be employed to identify similar components in the second slide assembly 20. The first slide assembly 18 can be fixedly mounted to the base 12 and can include a linear motor 80 and a slide mount 82. The linear motor 80 has an output member (not specifically shown) that is movable along a slide axis 86. Any type of linear motor 80 can employed, such as a pneumatic or hydraulic cylinder, but in the example provided, the linear motor 80 is a RCP Series electric actuator that is commercially available from IAI American of Torrance, Calif. The slide mount 82 is coupled to the output member for movement therewith along the slide axis 86. More specifically, the slide mount 82 can be moved by the linear motor 80 along the slide axis 86 between a first position and a second position. It will be appreciated that as described above, the first and second slide assemblies 18 and 20 permit movement of their respective slide mount 82 along a single associated axis 86. In the example provided, however, the second slide assembly 20 is configured with a second linear motor 80a. The second linear motor 80a has an output member (not shown) that can be coupled to the slide mount 82. Configuration in this manner permits the slide mount of the second slide assembly 20 to be moved along a slide axis 86a that is transverse (e.g., perpendicular) to the slide axis 86 associated with the linear motor 80.

The first slide assembly 18 and/or the second slide assembly 20 can be configured with an absolute position sensor that permits the position of an associated slide mount 82 along its associated axis 86. Configuration in this manner can eliminate the need for one or more of the slide mounts 82 to be indexed to a predetermined position prior to measuring a bevel gear product.

The first, second, third, and fourth measuring lasers 22, 24, 26 and 28 can be configured to collect a respective sets of profile data and responsively generate an associated data signal. The first, second, third, and fourth measuring lasers 22, 24, 26 and 28 can be LJ-V7000 Series profilometers commercially available from Keyence Corporation of America of Itasca, Ill. The first, second, third, and fourth measuring lasers 22, 24, 26 and 28 can be coupled to the slide mounts 82 of the first and second slide assemblies 18 and 20 in any desired manner. In the example provided, the first and fourth measuring lasers 22 and 28 are coupled to the slide mount 82 of the first slide assembly 18 for movement there with, while the second and third measuring lasers 24 and 26 are coupled to the slide mount of the second slide assembly 20 for movement there with. It will be appreciated that the first and second slide assemblies 18 and 20 can be operated to move the first, second, third, and fourth measuring lasers 22, 24, 26 and 28 away from the mount 16 to load and unload bevel gear products A from the mount 16, and to translate the first, second, third, and fourth measuring lasers 22, 24, 26 and 28 toward the mount 16 into predetermined positions that permit the first, second, third, and fourth measuring lasers 22, 24, 26 and 28 to take data that is relevant to the gauging of various dimension of the bevel gear product A.

The controller 30 can be coupled to the rotational position sensor 46 (FIG. 4) and the first, second, third, and fourth measuring lasers 22, 24, 26 and 28 and can receive the rotational position signal and the first, second, third and fourth data signals generated by the first, second, third, and fourth measuring lasers 22, 24, 26 and 28, respectively. If an absolute position sensor is incorporated into any of the first and second slide assemblies 18 and 20, the controller 30 can also receive output signals from those absolute position sensors and responsively determine the position of the associated slide mount(s) 82.

Returning to FIG. 6, the first measuring laser 22 can be disposed along a first measurement axis that can be disposed perpendicular to the predetermined plane. The first measuring laser 22 is configured to sense the back face B and the chamfer J of the bevel gear product A and transmit this information (i.e., a first data set in the form of the first data signal) to the controller 30 (FIG. 2). The second measuring laser 24 can be disposed along a second measurement axis that can be transverse to the first measurement axis. The second measuring laser 24 can be employed to sense a surface of the through bore C and a surface of the counterbore E and transmit this information (i.e., a second data set in the form of the second data signal) to the controller 30 (FIG. 2). The third measuring laser 26 can be disposed along a third measurement axis that can be transverse to each of the first and second measurement axes. The third measuring laser 26 can be employed to sense a surface of the counterbore E and one or more surfaces of the bevel gear product A that are relevant to the thickness D (FIG. 1) of the bevel gear product A and transmit this information (i.e., a third data set in the form of the third data signal) to the controller 30 (FIG. 2). The fourth measuring laser 28 can be disposed along a fourth measurement axis that can be transverse to each of the first, second and third measurement axes. The fourth measuring laser 28 can be employed to sense surfaces of the bevel gear product A that are relevant to the face angle F (FIG. 1), the back angle G (FIG. 1) and the outside diameter H (FIG. 1) and transmit this information (i.e., a fourth data set in the form of the fourth data signal) to the controller 30 (FIG. 2).

Returning to FIG. 2, the controller 30 can employ the rotational position signal and the first, second, third and fourth data sets to gauge the flatness of the back face B, the diameter and cylindricity of the through bore C, the thickness D of the bevel gear product A, the diameter and location of the counterbore E, the magnitude of the face angle F, the magnitude of the back angle G and the outside diameter H of the bevel gear product A.

While the fixture 10 has been illustrated and described as being configured for gauging a type of bevel gear product, it will be appreciated that the fixture 10 could be configured to gauge other types of gears and gear blanks (collectively referred to hereinafter as "gear products"), including parallel axis gears (e.g., spur and helical gears) and non-parallel axis gears (e.g., worms and worm gears). Those of skill in the art will appreciate that when the fixture 10 is employed to gauge a gear product other than a bevel gear product, it may be necessary to re-orient one or more of the measuring lasers shown herein, and moreover that more or fewer measuring lasers may be used to perform the gauging operation depending upon the configuration of the particular gear product and the dimension(s) of the gear product that are to be gauged.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fixture for performing a gauging operation on a bevel gear product having a back face, a through bore, a thickness, a counter bore, a face angle, a back angle and an outside diameter, the fixture comprising:
    a base;
    a mount that is coupled to the base for rotation about a mount axis, the mount including a plurality of feet and a plurality of fingers, the feet cooperating to establish a predetermined plane, the fingers being movable along the mount axis relative to the feet, the fingers being configured to center the bevel gear product about the mount axis and to permit the back face of the bevel gear product to rest against the feet so that the back face is co-planar with the predetermined plane;
    a rotational position sensor having a first sensor portion, which is fixedly coupled to the base, and a second sensor portion that is coupled to the mount for rotation therewith, the rotational position sensor sensing a rotational position of the mount relative to the base and responsively generating a rotational position sensor signal;
    a plurality of measuring lasers coupled to the base and disposed about the mount, each of the measuring lasers being configured to collect a set of profile data and responsively generate a data signal;
    a controller coupled to the rotational position sensor and the plurality of measuring lasers and receiving the rotational position sensor signal and each of the data signals and responsively generating at least one data set that comprises dimensional information on the bevel gear product as a function of a rotational position of the bevel gear product about the mount axis, the controller being configured to:
    gauge the first back face based on the at least one data set;
    gauge the through bore based on the at least one data set;
    gauge the counter bore and the thickness based on the at least one data set; and
    gauge the face angle, the back angle and the outside diameter based on the at least one data set.

2. The fixture of claim 1, wherein the at least one data set includes a plurality of data subsets, each of the data subsets being based on the dimensional information on the bevel gear product provided by an associated one of the measuring lasers.

3. The fixture of claim 2, wherein the controller is configured to generate the plurality of data subsets simultaneously.

4. The fixture of claim 1, further comprising a first slide assembly having a first slide mount that is movable along a first slide axis between a first position and a second position and wherein at least a first one of the plurality of measuring lasers is coupled to the first mount for movement therewith along the first slide axis.

5. The fixture of claim 4, further comprising a second slide assembly having a second slide mount that is movable along a second slide axis between a third position and a fourth position and wherein at least a second one of the plurality of measuring lasers is coupled to the second slide mount for movement therewith along the second slide axis.

6. The fixture of claim 5, wherein two of the plurality of measuring lasers are mounted to the second slide mount.

7. The fixture of claim 4, wherein two of the plurality of measuring lasers are mounted to the first slide mount.

8. A fixture for performing a gauging operation on a bevel gear product having a back face, a through bore, a thickness, a counter bore, a face angle, a back angle and an outside diameter, the fixture comprising:
a base;
a mount that is coupled to the base for rotation about a mount axis, the mount including a plurality of feet and a plurality of fingers, the feet cooperating to establish a predetermined plane, the fingers being movable along the mount axis relative to the feet, the fingers being configured to center the bevel gear product about the mount axis and to permit the back face of the bevel gear product to rest against the feet so that the back face is co-planar with the predetermined plane;
a rotational position sensor having a first sensor portion, which is fixedly coupled to the base, and a second sensor portion that is coupled to the mount for rotation therewith, the rotational position sensor sensing a rotational position of the mount relative to the base and responsively generating a rotational position sensor signal;
a first measuring laser coupled to the base and disposed along a first measurement axis, the first measuring laser being configured to collect a first set of profile data and responsively generate a first data signal;
a second measuring laser coupled to the base and disposed along a second measurement axis, the second measuring laser being configured to collect a second set of profile data and responsively generate a second data signal;
a third measuring laser coupled to the base and disposed along a third measurement axis, the third measuring laser being configured to collect a third set of profile data and responsively generate a third data signal;
a fourth measuring laser coupled to the base and disposed along a fourth measurement axis, the fourth measuring laser being configured to collect a fourth set of profile data and responsively generate a fourth data signal; and
a controller coupled to the rotational position sensor and the first, second, third and fourth measuring lasers, the controller being configured to:
gauge the back face based on the first data signal and the rotational position sensor signal;
gauge the through bore based on the second data signal and the rotational position sensor signal;
gauge the counter bore and the thickness based on the third data signal and the rotational position signal; and
gauge the face angle, the back angle and the outside diameter based on the fourth data signal and the rotational position sensor signal.

9. The fixture of claim 8, further comprising a first slide assembly having a first slide mount that is movable along a first slide axis between a first position and a second position and wherein at least one of the first, second, third and fourth measuring lasers is coupled to the first slide mount for movement therewith along the first slide axis.

10. The fixture of claim 9, further comprising a second slide assembly having a second slide mount that is movable along a second slide axis between a third position and a fourth position and wherein at least one of the first, second, third and fourth measuring lasers that is not mounted to the first slide mount is coupled to the second slide mount for movement therewith along the second slide axis.

11. The fixture of claim 10, wherein the second and third measuring lasers are mounted to the second slide mount.

12. The fixture of claim 9, wherein the first and fourth measuring lasers are mounted to the first slide mount.

* * * * *

UNITED STATES PATENT AND TRADEMARK OFFICE
CERTIFICATE OF CORRECTION

PATENT NO. : 10,852,124 B2
APPLICATION NO. : 16/449487
DATED : December 1, 2020
INVENTOR(S) : Sean M. Skinner et al.

Page 1 of 1

It is certified that error appears in the above-identified patent and that said Letters Patent is hereby corrected as shown below:

In the Claims

In Column 8, In Line 24 of Claim 8, after "position", insert --sensor-- therefor.

Signed and Sealed this
Fifth Day of January, 2021

Andrei Iancu
*Director of the United States Patent and Trademark Office*